E. DEXTER.
Counting Register.

No. 14,857.            Patented May 13, 1856.

Witnesses:
E. J. Y. Smith
Joseph P. Crowell

Inventor:
Elisha Dexter

UNITED STATES PATENT OFFICE.

ELISHA DEXTER, OF HOLMES HOLE, MASSACHUSETTS.

SELF-COUNTING MEASURE.

Specification of Letters Patent No. 14,857, dated May 13, 1856.

*To all whom it may concern:*

Be it known that I, ELISHA DEXTER, of Holmes Hole, in the county of Dukes and State of Massachusetts, have invented a new and useful Self Counting or Registering Measure, of which the following description, illustrated by the drawings and references, is sufficiently clear and comprehensive to enable others of competent ability to construct and use my invention.

It is customary, for the greater convenience of salesmen, to mark the extremities and various subdivisions of the yard or standard of measure directly upon their counters in a position convenient for use.

The nature of my invention consists in such an arrangement, that the very act of laying down the cloth upon the spot or mark which indicates the extremity of the yard, as is now necessarily and habitually done by all salesmen, shall be made to operate a pointer whose function is to register or indicate the number of yards so measured.

Figure 1:
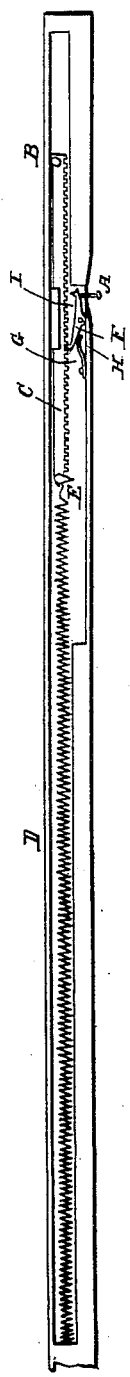
Figure 2:
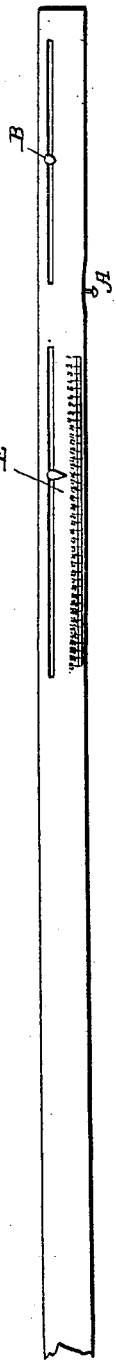

Figure 1 gives an interior view of the arrangement by which I effect this purpose and Fig. 2 shows the exterior with the pointer and scale of figures.

I supply the point upon which the salesman habitually presses down or applies his cloth with a knob A upon the surface of which the usual mark is made. B is also a knob attached to a sliding rack C and to this latter may be attached a coiled spring D. By this latter knob the operator, in putting the register in use, overcomes the coiled spring and slides the rack along till the pointer E, which is made fast to the rack, stands opposite the figure 1 upon the scale.

F is an escapement lever turning upon a pivot and having points at either end which alternately enter and leave the teeth or notches of the rack when the machine is in operation. The knob A is attached to this lever and is preserved in a raised position by the action of the spring G.

When the salesman presses upon the knob A, which he habitually and invariably does whenever he measures off a yard, this latter spring is overcome and the notch or point H of the lever is withdrawn from the tooth in which it has reposed and the point I at the same instant enters its appropriate tooth to prevent the pointer E from being carried too far. When the pressure is removed from the knob the spring G causes the point I to be withdrawn from the tooth of the rack and the point H entering a fresh tooth at the same instant awaits a repetition of the operator's pressure as at first. By this performance the pointer E will be found to have moved to the figure 2 and it will successively move by the same means to 3, 4 and so on as long as the measuring operation shall be continued, and keeping by this means a record of the actual number of yards measured off.

It is obvious that the counter may be hollowed out to receive this arrangement, or it may be placed in a separate case or frame of wood and made fast upon the counter. It will appear further that such a shape and relation may exist between the points H and I and the teeth or notches of the rack, that the very act of those points upon the teeth of the rack at the time of entrance, shall suffice to move the rack and pointer without the aid of the coiled spring. Moreover the relative position of the parts is in a measure optional, as the axis of the knob A may stand either perpendicular to the face of the index plate, as herein assumed, or parallel therewith as represented in the drawing.

What I claim as my invention and desire to secure by Letters Patent is as follows:

Supplying the point which marks the extremity of the yard or standard of measure with the pressure knob A and connecting it with the pointer E by means of the escapement lever F and the rack G as a means of pointing out the number of yards measured, upon the index as herein specified.

ELISHA DEXTER.

Witnesses:
 E. T. T. SMITH,
 JOSEPH P. CROWELL.